Oct. 20, 1942.                A. C. PERBAL                   2,299,251
                         ADJUSTABLE BRACKET
                         Filed Oct. 15, 1941          2 Sheets-Sheet 1

INVENTOR.
ALBERT C. PERBAL
BY
Lawrence H. Cohn

Oct. 20, 1942.     A. C. PERBAL     2,299,251
ADJUSTABLE BRACKET
Filed Oct. 15, 1941     2 Sheets-Sheet 2

INVENTOR.
ALBERT C. PERBAL
BY Lawrence H. Cohn

Patented Oct. 20, 1942

2,299,251

UNITED STATES PATENT OFFICE 2,299,251

ADJUSTABLE BRACKET

Albert C. Perbal, University City, Mo.

Application October 15, 1941, Serial No. 415,031

7 Claims. (Cl. 248—280)

This invention relates to improvements in adjustable brackets for lighting or other equipment, particularly to an improved equilibrated bracket.

The principal object of the invention, stated generally, is the provision of a highly flexible, easily adjusted supporting means for mobile apparatus, and the provision of improved mechanism for equilibrating the bracket in all positions thereof. Other objects are directed to the provision of a jointed bracket of this character embodying spring means for balancing the several sections of the bracket arm, and wherein the counterbalancing spring and associated parts are compactly assembled in an improved manner to facilitate installation thereof in a housing of relatively small dimension.

The foregoing objects are attained in the improved bracket of my invention by the provision of counterbalancing mechanism contained in a housing at the base of the bracket, and includes a spring which is so connected to the several sections of the bracket arm as to produce therein moments of counterbalancing forces which oppose and equilibrate the moments of load forces acting therein. By reason of the improved manner in which the spring delivers its counterbalancing force to the jointed bracket member, the effective counterbalancing force remains substantially constant, in spite of spring flexure, but the length of the counterbalancing moment arm is caused automatically to vary in direct proportion to the length of the load moment arm, incident to bracket adjustments. In this manner true equilibration of the bracket in all of its various positions is obtained.

The invention resides in the construction, combination and relation of parts that result in an improved bracket structure or components thereof specifically defined in the appended claims.

In the accompanying drawings.

Figure 4:
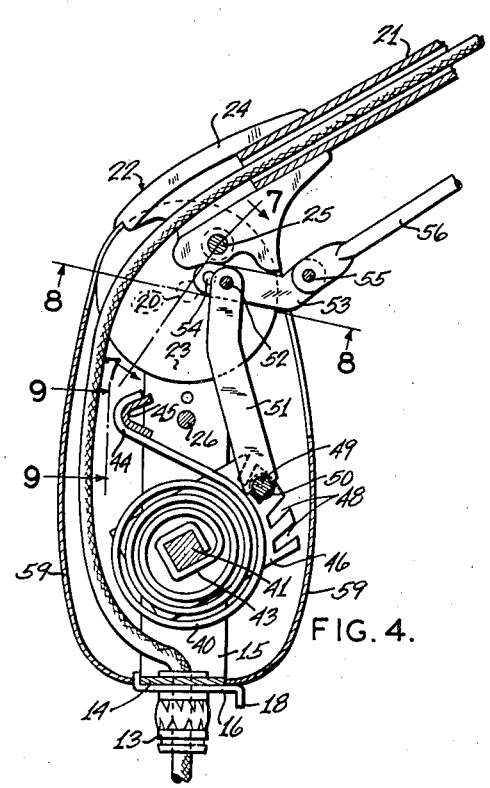
Fig. 4 is a sectional view similar to Fig. 3, taken at line 4—4 of Fig. 6.
Figure 7:
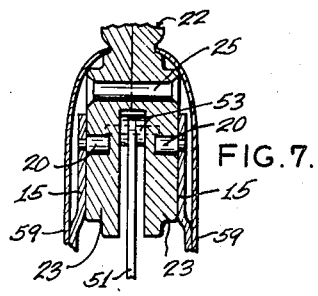
Figure 9:
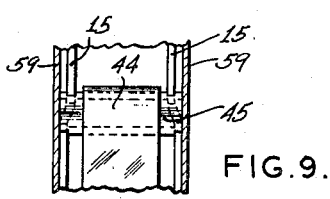
Figure 8:
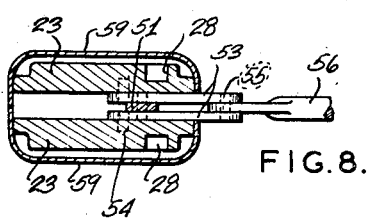

Figs. 7, 8 and 9 are sectional views showing structural details of the balancing mechanism, the sections being taken at lines 7—7, 8—8 and 9—9 respectively, of Fig. 4.

Referring now by characters of reference to the drawings, a base member 10 (Fig. 1), is shown provided with clamping means 11 for attachment to a table or other suitable object, designated 12. Base member 10 has an opening or bore in its upper end for the reception of a journal member 13, Fig. 2, by which the bracket is positioned on and adapted to swing about a vertical axis on the said base member. Journal member 13 is fixedly secured to the transverse part 14 of a U-shaped frame piece having upstanding leg portions 15. Tightly clamped between the transverse frame part 14 and journal member 13 is a plate 16 having an upturned lip 17 engaging the frame part 14 to prevent relative turning of these members, and a depending lip 18 at the edge of the plate opposite lip 17. The lip 18 is adapted to engage a shoulder (not shown) formed on base member 10, and serves to limit, to a desired extent, the angular movement of the bracket about its vertical axis. The journal member 13 is shown provided with a circular band 19, disposed in an annular groove in the journal, such band being arcuate in section and adapted to press against the adjacent surfaces of the base member, whereby it tends to hold the bracket in a set position on the base.

Figures 5, 6:
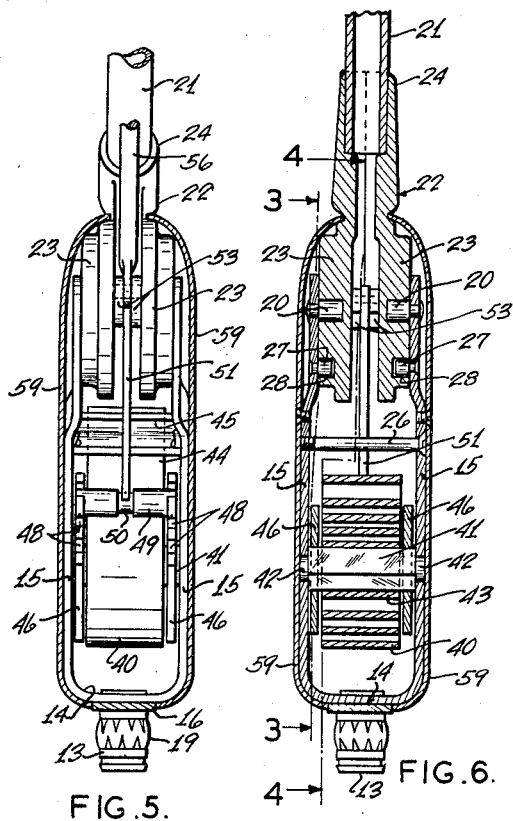
Fig. 5 is a sectional view of the balancing mechanism, taken at line 5—5 of Fig. 2.
Fig. 6 is a sectional view, similar to Fig. 5, taken at line 6—6 of Fig. 2.

The frame piece is provided with trunnion bearings 20, Fig. 6, which are secured to and extend inwardly, in aligned relation, from the leg portions 15 near the upper ends thereof, the bearings 20 defining a horizontal axis about which the inner arm section of the bracket is adapted to turn with respect to the base assembly identified with the frame piece. The inner arm section, designated 21, is preferably of tubular form and extends from a hub member 22 journalled on the trunnion bearings 20. Hub member 22 has a pair of disc-like portions 23, the greater part of whose inner confronting areas are separated to provide operating space therebetween to accommodate certain elements of the balancing mechanism to be hereinafter described. The aforesaid disc portions of the hub member join together at a zone at one side of the center along the margins thereof, and merge with a socket-like extension 24 which has a generally tangential trend with respect to the circular disc portions 23. In the present example the hub member 22 is shown to be formed of paired, complementary sections secured together by a rivet 25, Fig. 7, that extends transversely through the plates near the base of the socket portion 24. The socket portion 24 receives the inner end of the tubular arm section 21 and rigidly holds that member.

To prevent spreading of the leg portions 15 of the frame piece such as might allow trunnions 20 to withdraw from the bearing openings in the hub member, there is provided a screw 26 which interconnects portions 15. For purpose of limiting the extent of turning of the inner bracket section about the frame piece the legs 15 of that member are provided with inwardly projecting studs 27 (Fig. 6) which are disposed in arcuate grooves 28 (Fig. 2) formed in the outer faces of the hub plates 23.

At the outer end of arm section 21 is an elbow joint fitting comprising members 29 and 30 which are joined to pivot about a horizontal axis indicated at 31. The outer arm section 32 extends from member 30 and carries an elbow fitting at its outer end, comprising members 33 and 34. An electrical lamp socket 35 and lamp shade 36 are shown at the extreme outer end of the bracket arm, connected to member 35 of the elbow fitting, such lighting apparatus being shown by way of example and representing any piece of equipment or apparatus which may advantageously be mounted on a highly flexible supporting bracket, as is the bracket under present description.

As will clearly appear, positional adjustment of the supported object, herein represented by the lamp parts, may be accomplished by swinging the outer arm 32 on its elbow joint with the inner arm held stationary, or by swinging the entire arm structure about the hub joint, or by a compound adjustment wherein pivotal action takes place at both hub and outer joints. In every such instance the effective moment arm of the supported object or load, acting about the hub axis 20, varies, and a corresponding variation in force acting to counterbalance the load is required in order to maintain the system in equilibrium, so that the bracket arm will remain fixed in any position within its sphere of operation. In the present example the counterbalancing force is produced by a coil spring 40 located within the base housing and mounted between the legs 15 of the frame piece. The force produced by this spring opposes gravitational forces acting on the outer arm that tend to swing the same downwardly about the pivotal axis 31, and also those acting on the bracket arm as a whole that tend to swing the inner arm about its hub axis 20.

Figure 3:
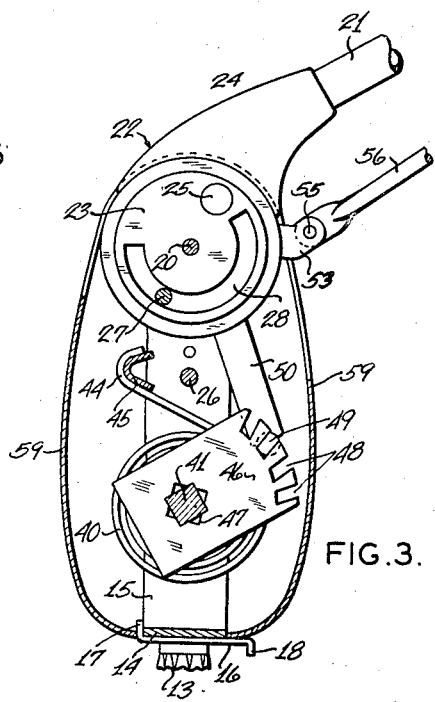
Fig. 3 is a sectional view of the balancing mechanism, taken at section line 3—3 of Fig. 6.

Spring 40 is mounted on a square shaft 41 that extends transversely between legs 15 or the U-shaped frame piece, the ends of shaft 40 being reduced to cylindrical form to provide bearings 42 which are journalled in the frame legs 15. The inner end 43 of the spring is bent to square shape to conform to the shaft which extends therethrough, so that the inner end of the spring is effectively connected to the shaft. The outer spring end 44 is bent to form a hook that engages a cross-piece 45 extending transversely of the frame legs 15. The cross-piece 45 seats in suitable notches provided in the rear edges of the frame legs, is held in place by the spring, and provides anchorage for the outer end thereof. Mounted on shaft 41 to turn therewith is a pair of plates or crank arms 46, each thereof being disposed at one side of the spring. These plates having aligned, star-shaped openings 47 (Fig. 3) to receive the shaft in fixed angular relation thereto. The corresponding forward edges of plates 46 are provided with series of recesses or notches 48 for the selective reception in any aligned pair thereof of the ends of a cross-pin 49. An annular groove 50 (Fig. 5) at the center of pin 49 accommodates and positions the lower end of a thrust link 51 whose upper end is connected by a bearing pin 52 to a lever 53. It will appear that plates 46 are in the nature of crank arms and transmit force from the squared shaft 41 through thrust link 51 to lever 53. Lever 53 is mounted in the space that intervenes the disc portions 23 of the hub member 24, and comprises a pair of laterally spaced members of identical shape. This lever is fulcrumed at its inner end to the hub member by a bearing pin 54 that extends across the hub space and has its ends seated in recesses in the inner faces of plate portions 23. As best appears in Fig. 4 the axis of fulcrum pin 54 of lever 53 is offset to one side of the hub axis 20. The outer or so-called free end of lever 53 is pivotally connected by a pin 55 to a thrust rod or link 56 whose opposite end is pivotally connected to the outer bracket arm. The member 30 of the elbow joint that connects the arm sections 21 and 32 has a pair of spaced bearing ears 57 depending from the lower side thereof, and the outer end of thrust rod 56 extends between and is connected to the ears by a bearing pin 58.

That part of the described mechanism which is mounted adjacent the base or frame piece of the bracket is desirably housed within a casing, comprising a pair of complementary shells 59 which are secured in place to the frame piece 15 and at opposite sides thereof by screws 60.

It will be understood that the described bracket is intended to support a device or appliance of fixed weight value at varying distances from its major pivotal axis, indicated at 20. To equilibrate the loaded bracket in all of its various positions, there is provided means for producing a counterbalancing force of substantially constant magnitude, acting upon the bracket arm at a point spaced from the major pivotal axis. Such space or distance, by the mechanism described herein, is caused to vary substantially in direct proportion to the degree of arm extension. Any increase in the moment of load force, as would result when the lamp head is moved outwardly away from the supporting base, is compensated for by an increase in the moment of counterbalancing force, in the manner hereinafter explained.

The counterbalancing force acts upwardly on lever 53 at bearing 52. The magnitude of such upwardly directed force is maintained substantially constant, within the range of movement of lever 53, despite variation in the tortional force of the spring due to flexion thereof. This results from the fact that as the crank arms 46 turn from a horizontal to a vertical position responsive to positional changes of the bracket sections, with attendant reduction of spring force acting on the crank arms, the horizontal length component of the crank arms reduces proportionately, with the net result that the upwardly directed force on the pin 52 remains substantially unchanged.

Figure 1:
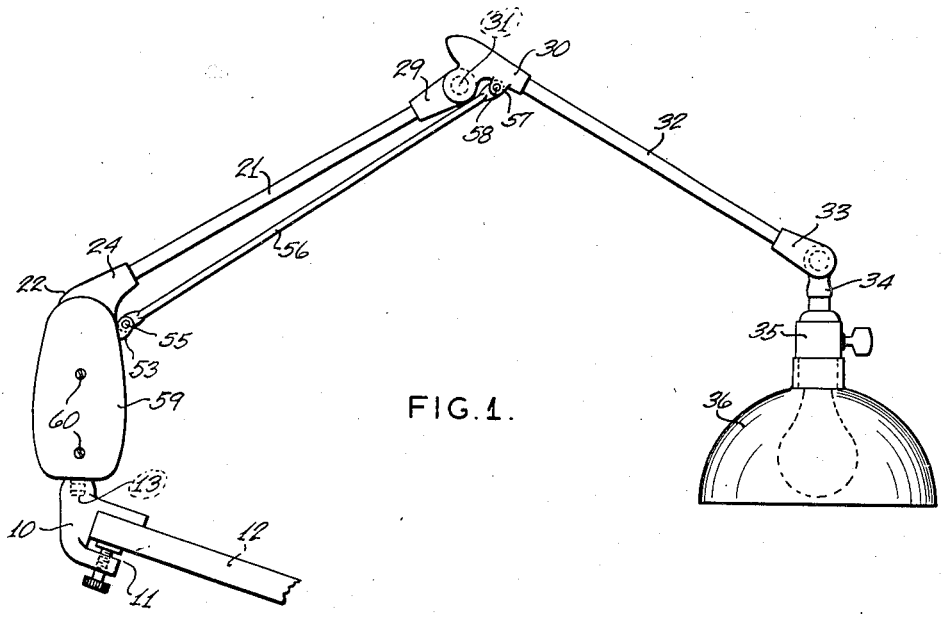
Fig. 1 is a side elevational view of a bracket structure constructed in accordance with my invention.
Figure 2:
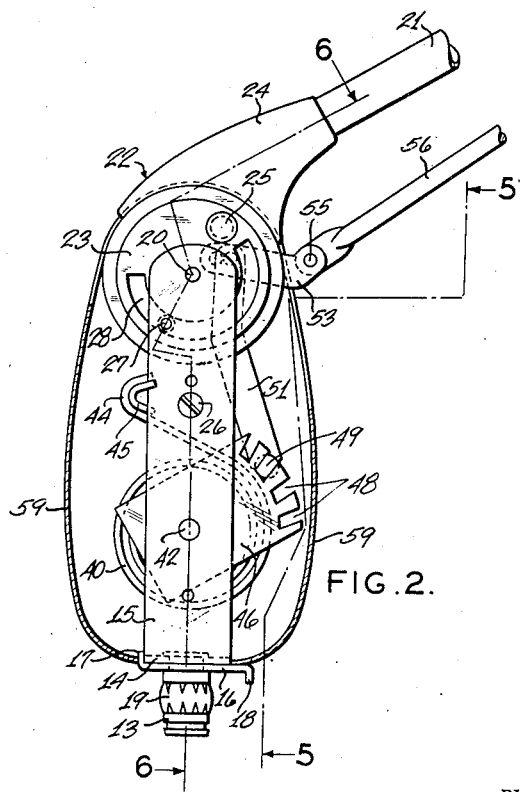
Fig. 2 is a side elevational view of the base assembly with a wall portion of the base housing removed to show the balancing mechanism.

Considering the action of the counterbalancing mechanism pursuant to bracket arm adjustments wherein the inner section 21 is stationary and the outer arm 32 caused to pivot about the axis 31, it will appear that when section 32 is swung inwardly, or clockwise, Fig. 1, which reduces the moment of load force, such movement is transmitted through strut rod 56 to lever 53. Lever 53 accordingly is caused to swing clockwise about its axis 54, which effects a corresponding or proportional reduction of the horizontal spacing between the axes 20 and 52. Such spacing determines the length of the moment arm of the counterbalancing spring force since the spring acts through strut link 51, upwardly upon pin

52. In a similar manner any change in the angular position of the inner arm 21 which effects a change in the effective length of the load moment arm operates to change the counterbalancing moment arm a proportional extent. It will appear that spring 40, in accordance with a stated object of the invention, functions to equilibrate the inner arm on its axis 20 and also the outer arm on its axis 31. The force produced by the spring acting upwardly at pin 52 is transmitted through the inner portion of lever 53 to the pin 52 where it is presented as an upward force. Such force creates a counterclockwise turning moment of the hub member 23 about the major axis 20, which opposes and equilibrates the clockwise moment arising from gravitational force acting on the arm. The action of the spring in opposing clockwise movement of lever 53 about pivot 54, as previously explained, effects a stabilization of the outer arm 32 with respect to the inner arm.

Since it is difficult to obtain, in quantity, springs having characteristics which are precisely uniform, it is desirable to provide means for varying the degree of spring loading so that the counterbalancing force produced by the spring may be adjusted to suit the requirements of the bracket. Also, in the event that the weight of the supported object is changed in substantial respect a corresponding change in spring loading would be necessary to equilibrate the bracket. In the construction described herein adjustment to increase or decrease spring loading may be accomplished by selecting a suitable pair of notches 48 in plates or crank arms 46 for the reception of the cross pin 49.

Although the invention has been described by making specific reference to a preferred embodiment, such description is to be understood as illustrative and not limiting, since many changes may be made in the parts, their arrangements and combinations, without departing from the full intended scope of the invention as defined by the claims hereunto appended.

I claim:

1. A counterbalanced bracket of the character described comprising a base, a jointed bracket arm having an inner section mounted to swing about a fixed pivotal axis on said base, an outer section pivoted to said inner section, a short link pivoted to said inner section at a point spaced from the said mounting axis of said inner section, a relatively long link pivoted at one end to said short link and at the opposite end to said outer section, and means pivotally connected to said short link and adapted to apply a counterbalancing force of substantially constant magnitude thereon, whereby to balance the bracket structure in all positions thereof.

2. An adjustable bracket comprising a base, an inner arm section connected to pivot about a major axis on said base, an outer arm section connected to pivot about a minor axis on the inner arm section, a lever element pivoted to said inner arm in spaced relation to said major axis, a spring mounted on the base, means connecting said spring to said lever, and means connecting said lever to the outer arm section, said spring being adapted to oppose gravitational forces acting on both of said arm sections that tend to turn the same about their respective mounting axes.

3. An adjustable bracket structure comprising a base, an inner arm section pivotally connected to said base to swing about a fixed axis thereon, an outer arm section pivoted to said inner section, a lever mounted on said inner section and having its fulcrum spaced from the axis of said inner arm, a link connecting said lever to said outer section, a spring mounted on said base, and means connecting said spring to said lever, said spring being adapted and arranged to oppose and balance gravitational forces acting on said arm sections and tending to turn the same about their respective axes.

4. An adjustable bracket including a base, a jointed bracket arm comprising an inner section mounted to pivot about a fixed axis on said base, an outer section pivotally mounted on said inner section, and means for equilibrating said jointed arm, said means comprising a lever mounted on said inner arm with its fulcrum spaced from the mounting axis of the inner section, a link pivoted at one end to said lever and at its opposite end to the outer section, a spring mounted on said base, and means connecting said spring to said lever, said spring being adapted to apply a force of substantially constant magnitude to said lever.

5. An adjustable bracket structure of the character described comprising a base, a jointed bracket arm extending therefrom and comprising an inner section connected to said base to pivot about a fixed horizontal axis thereon, an outer section carried by and pivotally connected to said inner section, and means for balancing said sections, comprising a lever mounted on and pivotally connected to said inner section to turn about an axis spaced from the fixed pivotal axis of the inner section, a link pivoted at one end to said lever and at its opposite end to the outer arm section, a coil spring mounted on said base, and means operatively connecting said spring to act on said lever at a point spaced from the pivotal mounting axis thereof, whereby spring force is transmitted to the inner and outer arm sections in balancing opposition to gravitational force that tend to turn these sections on their respective pivotal axes.

6. An adjustable bracket of the character described comprising a base, a jointed bracket arm having an inner section pivoted to said base and an outer section pivoted to said inner section, means for balancing said bracket arm, comprising a short link pivoted to said inner section at a point spaced from the axis of said inner section, a long link pivoted at one end to said short link and at the opposite end to the outer arm section, a thrust link pivoted at its upper end to said short link, and a torsion spring mounted on said base, operatively connected to the lower end of said thrust link for applying an upwardly directed force thereto.

7. An adjustable, counterbalanced bracket of the character described comprising a base, a jointed bracket arm having an inner section pivoted to said base to swing about a fixed axis thereon, an outer section pivoted to said inner section, a short link pivoted to said inner section at a point spaced from the axis of said inner section, a relatively long link pivoted at one end to said short link and at the opposite end to said outer arm section, a torsion spring mounted on said base, a crank member mounted coaxial with said spring, means connecting said spring and crank member, and a thrust link pivotally interconnecting said short link and crank member, whereby an upwardly directed force of substantially constant magnitude is applied to said short link.

ALBERT C. PERBAL.